(12) United States Patent
Friedrich et al.

(10) Patent No.: US 6,886,337 B2
(45) Date of Patent: May 3, 2005

(54) DRIVE UNIT WITH AN INTERNAL COMBUSTION ENGINE AND AN EXHAUST GAS TURBOCHARGER

(75) Inventors: Jürgen Friedrich, Crailsheim (DE); Peter Heilinger, Crailsheim (DE); Kai Kamossa, Crailsheim (DE)

(73) Assignee: Voith Turbo GmbH & Co. KG (DE)

( * ) Notice: Subject to any disclaimer, the term of this patent is extended or adjusted under 35 U.S.C. 154(b) by 0 days.

(21) Appl. No.: 10/469,567

(22) PCT Filed: Feb. 20, 2002

(86) PCT No.: PCT/EP02/01761

§ 371 (c)(1),
(2), (4) Date: Oct. 30, 2003

(87) PCT Pub. No.: WO02/070877

PCT Pub. Date: Sep. 12, 2002

(65) Prior Publication Data

US 2004/0068986 A1 Apr. 15, 2004

(30) Foreign Application Priority Data

Mar. 1, 2001 (DE) .......................... 101 10 011

(51) Int. Cl.⁷ .............................. F02G 3/00; F16H 47/08
(52) U.S. Cl. .............................. 60/614; 60/624; 60/607; 475/113
(58) Field of Search ..................... 60/624, 614, 607, 60/608, 605.3; 475/113

(56) References Cited

U.S. PATENT DOCUMENTS

| 4,452,043 A | * | 6/1984 | Wallace | 60/624 |
| 4,800,726 A | * | 1/1989 | Okada et al. | 60/614 |
| 4,843,822 A | * | 7/1989 | Okada | 60/624 |
| 4,882,906 A | * | 11/1989 | Sekiyama et al. | 60/624 |
| 4,894,992 A | * | 1/1990 | Sekiyama | 60/624 |
| 5,119,633 A | | 6/1992 | Brooks et al. | 60/624 |
| 5,729,978 A | * | 3/1998 | Hiereth et al. | 60/624 |

FOREIGN PATENT DOCUMENTS

| DE | 37 28 681 | 3/1988 | 60/614 |
| DE | 39 04 399 | 8/1990 | 60/624 |
| DE | 195 16 971 | 11/1995 | 60/624 |
| EP | 0 301 547 | 2/1989 | 60/614 |

OTHER PUBLICATIONS

International Search Report.

* cited by examiner

*Primary Examiner*—Thomas Denion
*Assistant Examiner*—Thai-Ba Trieu
(74) *Attorney, Agent, or Firm*—Ostrolenk, Faber, Gerb & Soffen, LLP

(57) ABSTRACT

The invention relates to a drive unit, comprising an internal combustion engine with a crankshaft; an exhaust line; an exhaust gas turbine which is acted on by the exhaust gas line, which is arranged downstream of the internal combustion engine and has the purpose of transmitting a positive torque to the crankshaft in the traction mode; a hydrodynamic unit which is arranged downstream of the exhaust gas turbine and has two turbine blades which form a torus-shaped working chamber; the hydrodynamic unit has a drive connection to the drive train; and a parking brake is provided for securing the primary turbine wheel of the exhaust gas turbine.

6 Claims, 2 Drawing Sheets

DRIVE UNIT WITH AN INTERNAL COMBUSTION ENGINE AND AN EXHAUST GAS TURBOCHARGER

FIELD OF THE INVENTION

The invention relates to a drive unit comprising an internal combustion engine.

BACKGROUND

DE 195 16 97 describes a drive unit having an internal combustion engine having turbocompound design. In this unit, a turbine is provided to which exhaust gas is fed from the internal combustion engine during the traction mode in order to drive the turbine. The turbine has a drive connection to the crankshaft via a hydrodynamic clutch. In this way it is possible to utilize the residual energy still present in the exhaust gas.

In the aforesaid drive unit, a further exhaust line is connected downstream of the turbine. An exhaust valve is provided in this exhaust line. At the changeover from the traction mode to the braking mode, the exhaust valve is closed. As a result, an exhaust gas pressure which causes the exhaust valve to open when a certain value is reached builds up behind the turbine.

DE 37 28 681 C2 and DE 39 04 399 A1 also describe drive units with devices for recovering exhaust gas energy.

Drive units of this type have the advantage that the residual heat which is contained in the exhaust gas is utilized—if appropriate after the exhaust gas has passed through an exhaust gas turbocharger. However, said drive units do not contribute directly to the braking in braking mode. The aforesaid exhaust valve performs the customary exhaust gas braking throttling which is known per se.

The invention is based on the object of configuring a drive unit of the aforesaid type in such a way that not only the residual energy contained in the exhaust gas is utilized in the traction mode but also in such a way that the drive unit contributes to the braking in the braking mode.

SUMMARY OF THE INVENTION

Accordingly, the hydrodynamic unit is configured in a particular way with the two turbine blades. The two turbine blades are in fact configured and arranged in such a way that they can operate as rotors. Here, their structure is basically the same as that of turbine blades of a hydrodynamic clutch or of a retarder. The difference with respect to a hydrodynamic clutch or with respect to a retarder is however the fact that one of the two rotors can be fixed or secured against rotation. The two rotors are arranged in one housing. The working space is filled with a fluid medium, for example with water or with oil. Any type of locking device, for example a multi-disc clutch, can be used to lock one of the two rotors.

Such a drive unit operates as follows:
In the traction mode, that is to say when the motor is circulating under load, both rotors of the hydrodynamic unit rotate as neither of the rotors is fixed in terms of rotation. One rotor is driven by the turbine, and said rotor itself drives the other rotor, which thus supplies torque to the drive train. The hydrodynamic unit thus operates as an entirely conventional hydrodynamic clutch. Accordingly, it has its advantages, namely gentle starting up which is largely free of torque surges. This applies not only when starting up but also during the entire traction mode. The load peaks are buffered in this way.

If the vehicle changes from the traction mode to the braking mode, one of the two rotors is stopped so that torque cannot be transmitted to the drive train any more. Instead, torque is removed from the drive train. In this process, that rotor which is located on the side of the hydrodynamic unit facing the turbine is stopped (primary wheel).

As an alternative to stopping (braking) the one rotor, other measures which intervene in the working of the hydrodynamic unit and which lead to the torque flux being interrupted are also conceivable.

The primary wheel is best braked by means of a parking brake, for example a multi-disc clutch.

BRIEF DESCRIPTION OF THE DRAWINGS

The invention is explained in more detail with reference to the drawing in which the following is illustrated.

DETAILED DESCRIPTIONS

Figure 1:
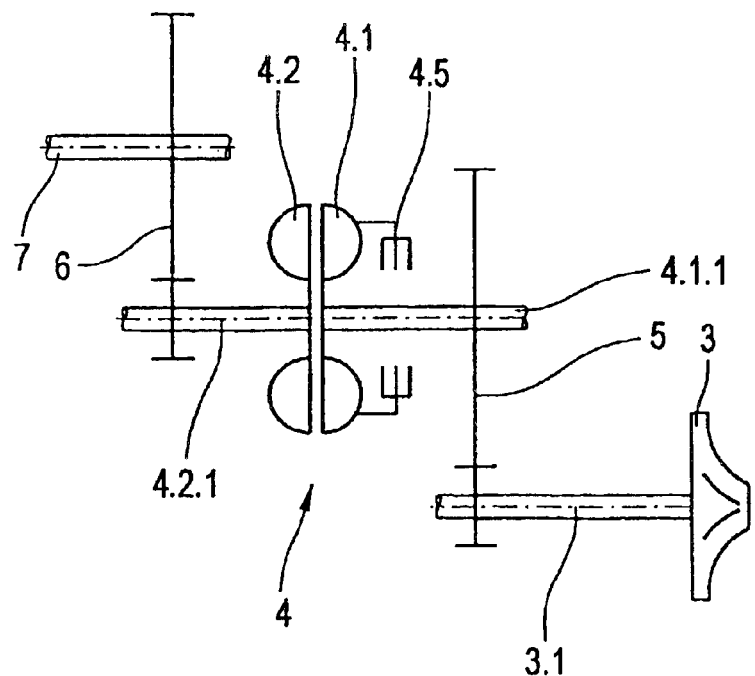
FIG. 1 shows a schematic view of a drive unit according to a first embodiment.

The drive unit according to the first embodiment which is illustrated schematically in FIG. 1 comprises an exhaust gas turbine 3. The exhaust gas stream of an engine (not shown here) is applied to said exhaust gas turbine 3. The exhaust gas turbine 3 is however not a component of an exhaust gas turbocharger. An exhaust gas turbocharger may be connected upstream of the aforesaid exhaust gas turbine 3.

A hydrodynamic unit 4 is also shown. Said hyrodynamic unit 4 has a primary turbine wheel 4.1 and a secondary turbine wheel 4.2. The two turbine wheels are configured like the turbine wheels of a hydrodynamic clutch or of a hydrodynamic brake. However, both turbine wheels are basically freely rotatable. A parking brake 4.5 is assigned to the primary wheel 4.1. In this way the primary wheel 4.1 can be locked.

A sensor 101 may be provided to sense the operating state of the engine (i.e., normal mode or braking mode) and supply a corresponding signal to a central process unit 106. The central processor unit 106 may then control the parking brake 4.5 via an actuator device 116 for securing the primary wheel 4.1 in the braking mode.

It is apparent that the exhaust gas turbine 3 has a mechanical drive connection to the primary turbine wheel 4.1, specifically via a drive shaft 3.1, a first gear train 5 and a drive shaft 4.1.1.

The secondary turbine wheel 4.2 is connected fixed in terms of rotation to a further drive shaft 4.2.1. The latter operates on a second gear train 6, which in turn has a drive connection to a shaft 7. The shaft 7 operates on the crankshaft or on another energy consuming device, for example, a fan wheel.

During normal driving when the engine circulates under load, exhaust gas is fed to the exhaust gas turbine 3. The parking brake 4.5 is not functioning so that the two wheels 4.1, 4.2 can rotate freely. The exhaust gas stream is applied to the exhaust gas turbine 3 so that it generates torque which is fed to the primary wheel 4.1 and causes it to rotate. As a result of the working fluid contained in the working space of the hydrodynamic unit 4, torque is transmitted to the secondary wheel 4.2 and from there to the crankshaft 7 or to another energy consuming device.

During the braking mode, only a small exhaust gas stream occurs in any case. This is diverted so that it does not act on the turbine 3. The parking brake 4.5 is actuated so that the primary wheel 4.1 is secured. The hydrodynamic unit 4 thus becomes a retarder. If the shaft 7 has a drive connection to the crankshaft, the device illustrated contributes to the braking.

Figure 2:
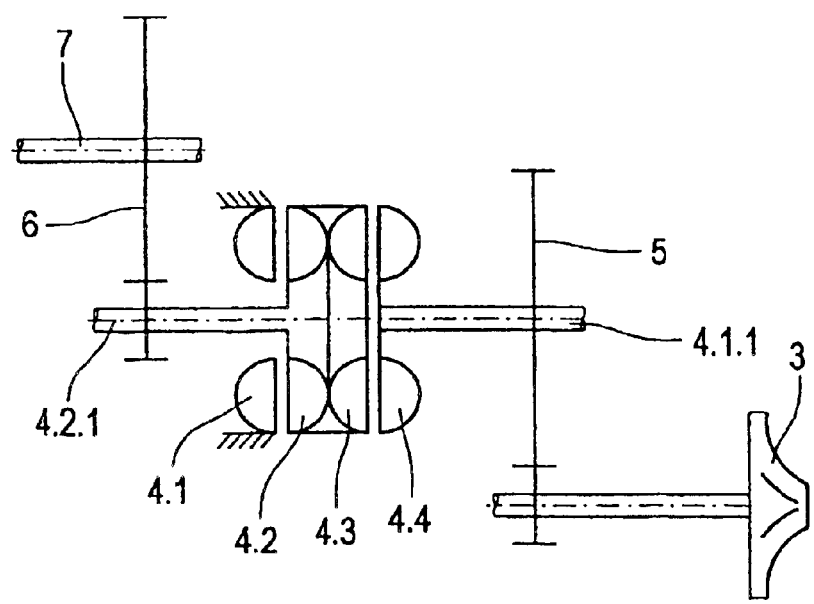
FIG. 2 shows a schematic view of a drive unit according to a second embodiment.

The drive unit of the secondary embodiment which is illustrated in FIG. 2 has a similar design to the drive unit of the first embodiment. However, the hydrodynamic unit 4 comprises a hydrodynamic brake 4.1, 4.2 (retarder), and a hydrodynamic clutch 4.3, 4.4.

The turbine wheel 4.1 of the retarder forms the stator here, and the turbine wheel 4.2 the rotor.

The two wheels 4.3, 4.4 of the clutch are freely rotatable. The wheels 4.2 of the retarder and 4.3 of the clutch are connected fixed in terms of rotation to one another so that they rotate together. They may even be embodied as a single cast part.

Moreover, in the drive unit of the second embodiment, the same or similar elements are present like those in the drive unit of the first embodiment, with the exception of the parking brake 4.5 of the first embodiment, which is absent in the second embodiment.

The drive unit of the second embodiment operates as follows:

In the traction mode, the working space of the retarder 4.1, 4.2 is empty, while the working space of the clutch 4.3, 4.4 is filled with a working medium, generally an oil.

An exhaust gas stream is applied to the exhaust gas turbine 3 from the internal combustion engine (not illustrated here). The exhaust gas turbine 3 drives the first gear train 5 via the shaft 3.1, and the shaft 4.1.1 drives the primary wheel 4.4 of the clutch. Said primary wheel 4.4 transmits torque to the tandem unit, formed from the secondary wheel 4.3 of the clutch and the wheel 4.2 of the retarder. These two wheels are connected to one another fixed in terms of rotation and form what is referred to as a back-to-back unit. From there, torque is transmitted onward via the shaft 4.2.1 and the second gear train 6 to the crankshaft 7.

During the braking mode, the working space of the retarder 4.1, 4.2 is filled. The working space of the hydrodynamic clutch 4.3, 4.4 remains filled. Owing the filling, the retarder 4.1, 4.2 carries out its braking function. The exhaust gas turbine 3 then generates a counter pressure in the exhaust line, which counter pressure passes into the cylinder spaces and boosts the braking effect of the entire unit.

Figure 3:
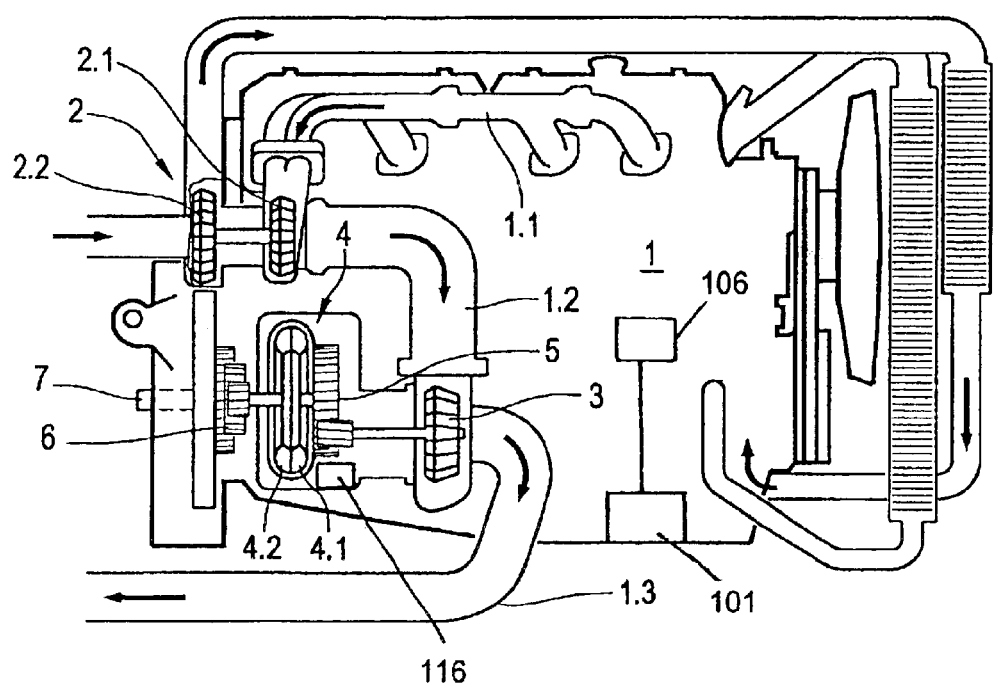
FIG. 3 shows a drive unit in which the individual components are illustrated somewhat more specifically.

FIG. 3 shows a drive unit. It comprises an internal combustion engine 1. A main exhaust line 1.1 is connected to the internal combustion engine 1. Said main exhaust line 1.1 feeds exhaust gas to an exhaust gas turbocharger 2, specifically its turbine part 2.1. The exhaust gases which flow out from the turbine part 2.1 pass through a second exhaust line 1.2 to a further exhaust gas turbine 3.

A hydrodynamic unit 4 is shown. It comprises a primary wheel 4.1 and a secondary wheel 4.2. The primary wheel 4.1 has a drive connection to the further exhaust gas turbine 3, specifically via a first gear train 5 which constitutes a step-up gear. The secondary wheel 4.2 has a drive connection to the crankshaft 7 via a second gear train 6.

The two turbine wheels 4.1, 4.2 are rotatably mounted and thus basically designed as rotors. They have the customary blades of a hydrodynamic clutch or of a hydrodynamic brake (retarder). The blades face one another with their free edges. The turbine wheel 4.1 acts as a primary part and the turbine wheel 4.2 as a secondary part. The turbine wheel 4.1 can be locked by means of a mechanical locking device, for example by means of a multi-disc clutch.

The drive unit of course comprises further components such as, for example, a cooling device and a fan, which are, however, indicated only schematically here. The intake air is indicated by means of a white arrow, while the exhaust gases are indicated by means of black arrows.

When the engine 1 runs under load in the traction mode, the exhaust gases which are fed in the main exhaust line 1.1 act on the turbine part 2.1 of the exhaust gas turbocharger 2. The compressor part 2.2 of the exhaust gas turbocharger 2 compresses the sucked-in combustion air in a known fashion.

The exhaust gases then enter the second exhaust line 1.2 and act on the turbine wheel of the further exhaust gas turbine 3. The further exhaust gas turbine 3 drives the primary wheel 4.1 of the hydrodynamic unit 4 via the first gear train 5. Torque is then transmitted to the secondary wheel 4.2, specifically by means of the working fluid contained in the working space of the hydrodynamic unit. The secondary wheel 4.2 passes this torque on to the crankshaft 7, or to another point where it is required within the drive unit. The exhaust gases finally leave the drive unit through a third exhaust line 1.3.

During the braking mode, the rotor is in an idling mode in which exhaust gases are produced only in small amounts. The further exhaust gas turbine 3 is thus acted on only to a small degree. Here, it is desirable that it is not acted on at all, and thus also introduces no drive energy into the drive train. For this reason it is expedient also to divert the small exhaust gas stream occurring during braking so that said stream cannot act on the further exhaust gas turbine 3.

However, the decisive measure is to secure the primary wheel in the way mentioned above, thus by means of some type of mechanical brake. The primary wheel 4.1 then acts as a stator turbine wheel. As a result, the hydrodynamic unit acts as a retarder so that no drive energy passes into the drive train, but on the contrary energy is removed from the drive train so that a contribution is made to the braking work.

The turbine wheels of the hydrodynamic unit, if appropriate composed of retarder and clutch, can be arranged inclined with respect to the axis of rotation of the hydrodynamic unit, and thus not in parallel with it.

Of course, instead of the above-mentioned gear wheels it is also possible to use other force-transmitting units such as chain drives.

| List of reference numerals | |
| --- | --- |
| 1 | Engine |
| 1.1 | Main exhaust line |
| 1.2 | Second exhaust line |
| 1.3 | Third exhaust line |
| 2 | Exhaust gas turbocharger |
| 2.1 | Turbine part of the exhaust gas turbocharger |
| 2.2 | Compressor part of the exhaust gas turbocharger |
| 3 | Exhaust gas turbine |
| 4 | First gear train |
| 5 | Second gear train |
| 7 | Crankshaft |
| 10 | Parking brake |

What is claimed is:

1. A method for operating a drive unit of a vehicle, the vehicle including an internal combustion engine having a crankshaft, an exhaust line, an exhaust gas turbine coupled to the exhaust line downstream from the internal combustion engine and operable to be acted upon by the exhaust line, a hydrodynamic unit coupled to the exhaust gas turbine and to the crankshaft, the hydrodynamic unit including freely rotatable rotor-turbine blade assemblies arranged within a working space, the method comprising the steps of:

in a traction mode, operating the hydrodynamic unit as a hydrodynamic clutch so that the exhaust gas turbine transmits a positive torque to the crankshaft via the hydrodynamic unit; and in a braking mode, operating the hydrodynamic unit as a retarder to retard rotation of the crankshaft by braking one of the freely rotatable turbine blades of the hydrodynamic unit.

2. The method of claim 1, wherein the braking of the freely rotatable rotor-turbine blade assemblies in the braking mode is performed using a parking brake.

3. The method of claim 1, wherein the internal combustion engine further includes:

a central processing unit, a sensor for sensing an operational state of the vehicle and for communicating a signal to the central processing unit in accordance with the operational state of the vehicle; and an actuator operable to be acted upon by the central processing unit to brake one of the freely rotatable rotor-turbine blade assemblies of the hydrodynamic unit in the braking mode.

4. The method of claim 1, wherein the braking of one the freely rotatable rotor-turbine blade assemblies in the braking mode is performed using a multi-disc clutch.

5. A drive unit of a vehicle, comprising:

an internal combustion engine having a crankshaft;

an exhaust line;

an exhaust gas turbine coupled to the exhaust line downstream in the flow of exhaust gas from the internal combustion engine; and a hydrodynamic unit coupled to the exhaust gas turbine and to the crankshaft, the hydrodynamic unit including:

a hydrodynamic clutch having a first working space filled with a first hydrodynamic fluid and first and second freely rotatable rotor-turbine blade assemblies arranged within the first working space;

the hydrodynamic unit further including a hydrodynamic brake arranged coaxially with the hydrodynamic clutch, the hydrodynamic brake having a second working space and a freely rotatable rotor and a stator arranged within the second working space, the first rotatable rotor-turbine blade assembly of the hydrodynamic clutch being fixedly coupled to the rotor of the hydrodynamic brake so that the first rotatable rotor-turbine blade assembly and the rotor are rotatable together;

wherein the second working space is emptied of a second hydrodynamic fluid in a traction mode so that the exhaust gas turbine transmits a positive torque to the crankshaft via the hydrodynamic unit, and the second working space is filled with the second hydrodynamic fluid in a braking mode to retard rotation of the crankshaft.

6. The drive unit of claim 5, further comprising a bypass line connected in the exhaust line for diverting exhaust gasses in the exhaust line around the exhaust gas turbine.

* * * * *